United States Patent
Ito et al.

(10) Patent No.: US 10,634,942 B2
(45) Date of Patent: Apr. 28, 2020

(54) ELECTRO-OPTICAL DEVICE AND ELECTRONIC DEVICE HAVING BASE MEMBER, LENS MEMBER AND FIRST AND SECOND INSULATORS

(71) Applicant: SEIKO EPSON CORPORATION, Tokyo (JP)

(72) Inventors: Satoshi Ito, Eniwa (JP); Daisuke Sawaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 77 days.

(21) Appl. No.: 15/926,526

(22) Filed: Mar. 20, 2018

(65) Prior Publication Data
US 2018/0314087 A1    Nov. 1, 2018

(30) Foreign Application Priority Data
Apr. 26, 2017    (JP) .................... 2017-086944

(51) Int. Cl.
| G02F 1/1333 | (2006.01) |
| G02F 1/1335 | (2006.01) |
| G02F 1/1362 | (2006.01) |

(52) U.S. Cl.
CPC .. *G02F 1/133345* (2013.01); *G02F 1/133526* (2013.01); *G02F 1/136209* (2013.01)

(58) Field of Classification Search
CPC ......... G02F 1/133526; G02F 1/133345; G02F 1/136209
See application file for complete search history.

(56) References Cited

U.S. PATENT DOCUMENTS

| 7,075,594 | B2 * | 7/2006 | Ueda ................. G02F 1/136209 349/138 |
| 2006/0114374 | A1 | 6/2006 | Segawa et al. |
| 2012/0249911 | A1 * | 10/2012 | Kamino ............ G02F 1/136209 349/42 |
| 2015/0041833 | A1 * | 2/2015 | Nimura ............... H01L 27/1214 257/88 |
| 2017/0097531 | A1 | 4/2017 | Tateno |

FOREIGN PATENT DOCUMENTS

| JP | 2002-091339 A | 3/2002 |
| JP | 2005-333042 A | 12/2005 |
| JP | 2006-184877 A | 7/2006 |
| JP | 2013-073181 A | 4/2013 |
| JP | 2017-072630 A | 4/2017 |

* cited by examiner

Primary Examiner — Paisley L Wilson
(74) Attorney, Agent, or Firm — Oliff PLC

(57) ABSTRACT

An electro-optical device includes a pixel electrode, a light shielding, a first insulator, a second insulator provided to be in contact with the first insulator on an opening region, a base member including a concave portion disposed to an outside of the second insulator and overlapped with the second insulator, and a lens member provided on the base member to cover the concave portion, and having the refractive index higher than that of the base member, in which the second insulator functions as a waveguide which reflects incident light at an interface between the second insulator and the first insulator, and propagates the incident light inside the second insulator, and the lens member refracts the incident light incident on the lens member from the second insulator or the incident light incident on the second insulator from the lens member at an interface with the concave portion.

7 Claims, 12 Drawing Sheets

ELECTRO-OPTICAL DEVICE AND ELECTRONIC DEVICE HAVING BASE MEMBER, LENS MEMBER AND FIRST AND SECOND INSULATORS

BACKGROUND

1. Technical Field

The present invention relates to an electro-optical device and an electronic device.

2. Related Art

A liquid crystal display device including a liquid crystal layer between an element substrate provided with a plurality of pixel electrodes and switching elements and a counter substrate disposed opposite to the element substrate is known. In correspondence with each pixel electrode, an opening region which is a region transmitting light is provided. In the liquid crystal display device, it is required to improve light utilization efficiency by suppressing incident light from deviating from the opening region.

In JP-A-2013-73181, a technology in which a lens (microlens) is provided in the opening region of the element substrate is disclosed. In JP-A-2013-73181, a concave portion including a bottom having a shape corresponding to the lens is formed in the opening region by dry etching using a light shielding layer defining the opening region as a mask. Then, by filling the concave portion with glass or resin, a lens is formed.

However, in the technology described in JP-A-2013-73181, a disposition region of a lens is limited to the inside of an opening region.

SUMMARY

An advantage of some aspects of the invention is to provide a novel technology capable of improving light utilization efficiency by using a lens which can be disposed to the outside of an opening region in an electro-optical device such as a liquid crystal display device and an electronic device including the electro-optical device.

According to an aspect of the invention, there is provided an electro-optical device including: a pixel electrode; a light shielding member that is provided along an edge of the pixel electrode in a planar view viewed in a thickness direction that is a direction perpendicular to the pixel electrode; a first insulator that is provided in a region overlapped with at least the light shielding member, and formed of a first material of light transmission in the planar view; a second insulator that is provided to be in contact with the first insulator on an opening region surrounded by the light shielding member in the planar view, and formed of a second material, having a refractive index higher than that of the first material, of the light transmission; a base member that includes a concave portion disposed to an outside of the second insulator which is overlapped with the second insulator and is formed of a third material of the light transmission in the planar view; and a lens member that is provided on the base member to cover the concave portion, and formed of a fourth material, having the refractive index higher than that of the third material, of the light transmission, in which the second insulator functions as a waveguide which reflects incident light incident on the second insulator at an interface between the second insulator and the first insulator, and propagates the incident light inside the second insulator, and the lens member is disposed between the second insulator and the base member in the thickness direction, and refracts the incident light incident on the base member by being transmitted from a second insulator side to the lens member or the incident light incident on the second insulator by being transmitted from a base member side to the lens member at an interface with the concave portion.

According to the configuration, by providing the second insulator as the waveguide, since it is possible to suppress the incident light from deviating from the opening region, the light utilization efficiency is improved. Furthermore, since it is possible to refract the incident light passing through the outside of the second insulator to the inside of the opening region by the lens member provided to cover a concave portion disposed to the outside of the second insulator in the planar view, it is possible to further improve the light utilization efficiency.

In the electro-optical device, the second insulator and the lens member may be separated from each other in the thickness direction. According to the configuration, since it is not necessary to form the second insulator to the thickness reaching the lens member, it is possible to easily form the second insulator.

In the electro-optical device, the second insulator may be disposed to a position close to the lens member with respect to the light shielding member in the thickness direction. According to the configuration, even if the second insulator and the lens member are separated from each other, light emitted from the second insulator can be easily incident on the lens member, or the light emitted from the lens member can be easily incident on the second insulator.

In the electro-optical device, the second insulator and the lens member may be in contact with each other in the thickness direction. According to the configuration, it is possible for light to be directly incident on the lens member from the second insulator, or it is possible for light to be directly incident on the second insulator from the lens member.

In the electro-optical device, the lens member may include a lens layer that is disposed in a range in which the concave portion is provided in the thickness direction, and a light transmission layer that is disposed in a second insulator side with respect to the lens layer in the thickness direction. According to the configuration, by adjusting the thickness of the light transmission layer, it is possible to adjust an optical path length of light transmitting the opening region.

In the electro-optical device, the electro-optical device further includes a semiconductor element that is provided in a position in which a first light shielding layer and a second light shielding layer are overlapped with each other in the planar view, and provided between the first light shielding layer and the second light shielding layer in the thickness direction, in which the light shielding member includes the first light shielding layer and the second light shielding layer disposed in a position different from that of the first light shielding layer in the thickness direction, and a portion that is overlapped with the first light shielding layer in the planar view, and a range in which the second insulator is disposed in the thickness direction includes a range from a surface facing a semiconductor element side of the first light shielding layer to a surface facing a semiconductor element side of the second light shielding layer in the thickness direction. According to the configuration, it is possible to suppress irradiation of the incident light to the semiconductor element.

In the electro-optical device, the second insulator may be disposed by being separated from an inside of the opening region with respect to an edge of the light shielding member and provided in contact with the first insulator in the planar view. According to the configuration, it is possible to suppress reflection of the incident light by the edge of the light shielding member.

According to another aspect of the invention, there is provided an electronic device of the invention including the electro-optical device.

In the electro-optical device, by the second insulator and the lens member included in the electro-optical device, the light utilization efficiency in the electronic device is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings and the like. However, in each figure, the dimensions and scales of each part are appropriately different from the actual ones. In addition, since the embodiments described below are preferable specific examples of the invention, various technical limitations are given, but the scope of the invention is not limited to these forms unless otherwise stated to limit the invention in the following description.

First Embodiment

As one embodiment of the invention, an active matrix type liquid crystal display device 100 including a thin film transistor (TFT) as a switching element of a pixel is exemplified.

Figure 1:
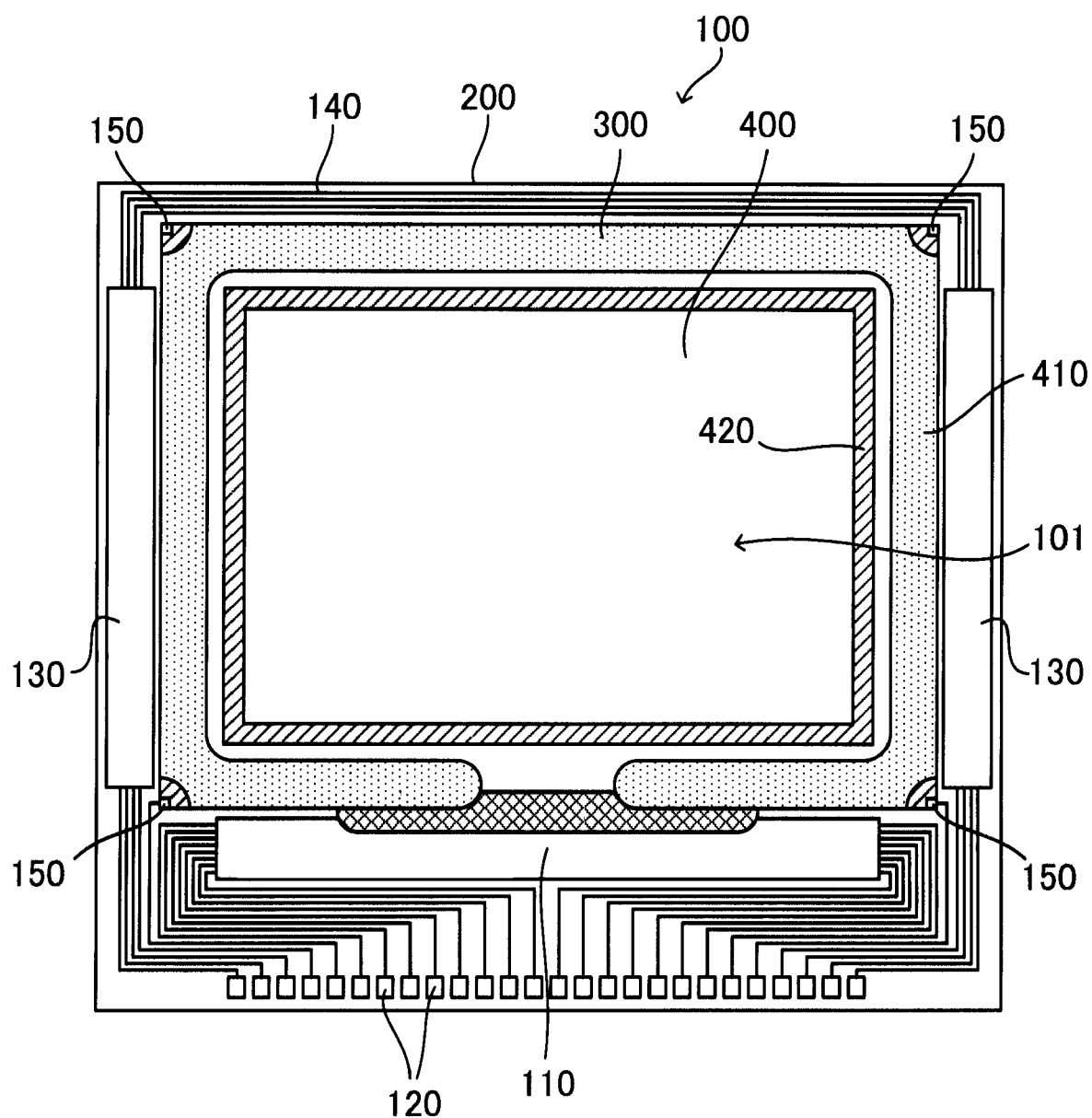
FIG. 1 is a schematic planar view showing a configuration of a liquid crystal display device according to an embodiment.

FIG. 1 is a schematic planar view showing an example of an overall configuration of the liquid crystal display device 100. The liquid crystal display device 100 includes an element substrate 200, a counter substrate 300 disposed opposite to the element substrate 200, and a liquid crystal layer 400 disposed between the element substrate 200 and the counter substrate 300.

The element substrate 200 and the counter substrate 300 are bonded through a sealing material 410 disposed in a frame shape. The liquid crystal layer 400 is formed of a liquid crystal having positive or negative dielectric anisotropy sealed in a space surrounded by the element substrate 200, the counter substrate 300, and the sealing material 410.

For example, the sealing material 410 is made of an adhesive such as a thermosetting or ultraviolet curable epoxy resin. In the sealing material 410, a spacer for maintaining a constant interval between the element substrate 200 and the counter substrate 300 is mixed. A peripheral portion 420 made of a light shielding material is formed inside a formation region of the sealing material 410. The inside of the peripheral portion 420 is a display region 101 in which a plurality of pixels are arranged.

On a region outside the sealing material 410, a data line driving circuit 110 and an external circuit mounting terminal 120 are provided along one side of the element substrate 200 and a scanning line driving circuit 130 is provided along two sides adjacent to the one side. On the remaining side of the element substrate 200, a plurality of wirings 140 for connecting between the scanning line driving circuits 130 on both sides are provided. At the corner portion of the counter substrate 300, an inter-substrate conducting material 150 for providing electrical conduction between the element substrate 200 and the counter substrate 300 is provided.

For example, the liquid crystal display device 100 is operated in a twisted nematic (TN) mode or a vertical alignment (VA) mode. For example, the liquid crystal display device 100 is used as a transmissive display device that modulates light incident from a counter substrate 300 side and emits light to an element substrate 200 side.

Figure 2:
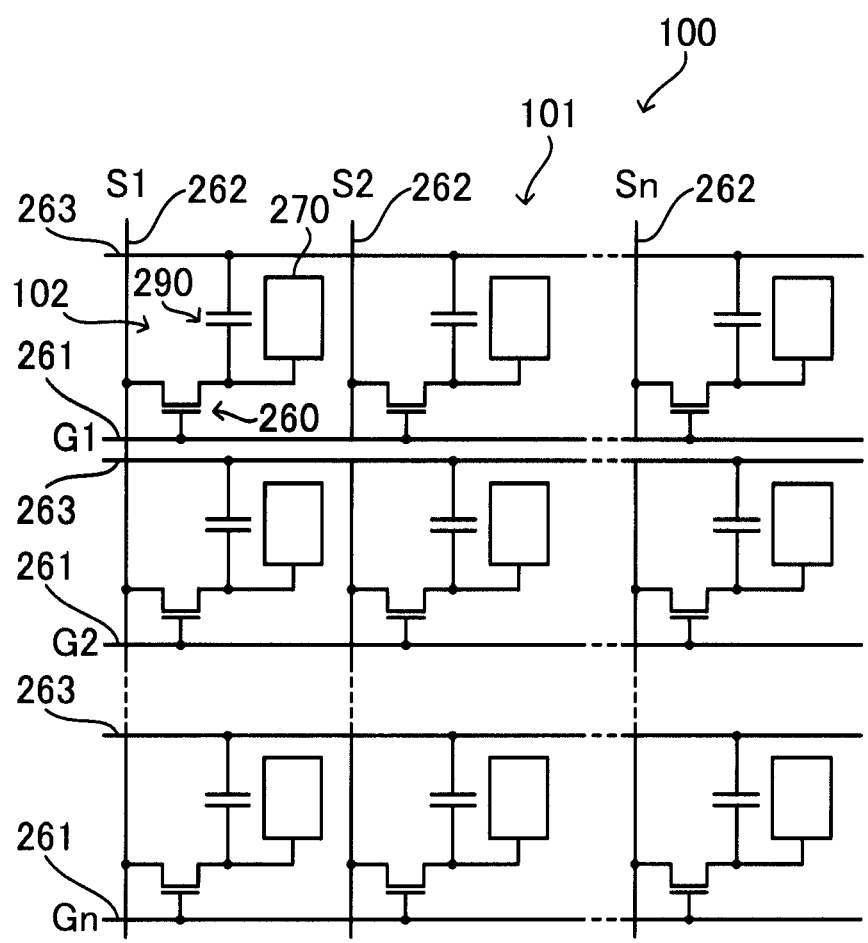
FIG. 2 is an equivalent circuit diagram showing an electrical configuration of the liquid crystal display device according to the embodiment.

FIG. 2 is an equivalent circuit diagram showing an example of an electrical configuration of the liquid crystal display device 100. A plurality of pixels 102 are arranged in a matrix on the display region 101. A pixel electrode 270 and a TFT 260 are provided on each pixel 102. A source electrode of the TFT 260 is electrically connected to a data line 262 extending from the data line driving circuit 110 (see FIG. 1). Image signals (data signals) S1, S2, . . . , Sn are sequentially supplied from the data line driving circuit 110 to the data line 262. A gate electrode of the TFT 260 is electrically connected to a scanning line 261 extending from the scanning line driving circuit 130 (see FIG. 1). Scanning signals G1, G2, . . . , Gn are sequentially supplied from the scanning line driving circuit 130 to the scanning line 261. A drain electrode of the TFT 260 is electrically connected to the pixel electrode 270.

The image signal S1, S2, . . . , Sn are written into the pixel electrode 270 at a predetermined timing through the data line 262 by turning on the TFT 260 for a certain period. The image signal of a predetermined level written in the liquid crystal layer 400 through the pixel electrode 270 in this manner is held for a certain period by liquid crystal capacitance formed with a common electrode 370 (see FIG. 3) provided in the counter substrate 300.

In order to prevent the held image signal S1, S2, . . . , Sn from leaking, a storage capacitor 290 is formed between the pixel electrode 270 and a capacitor line 263, and disposed in parallel to the liquid crystal capacitance. In this manner, a voltage signal is applied to a liquid crystal of each pixel 102 and an alignment state of the liquid crystal is changed according to the applied voltage level such that light incident on the liquid crystal layer 400 (see FIG. 3) is modulated and gradation display becomes possible.

Figure 3:
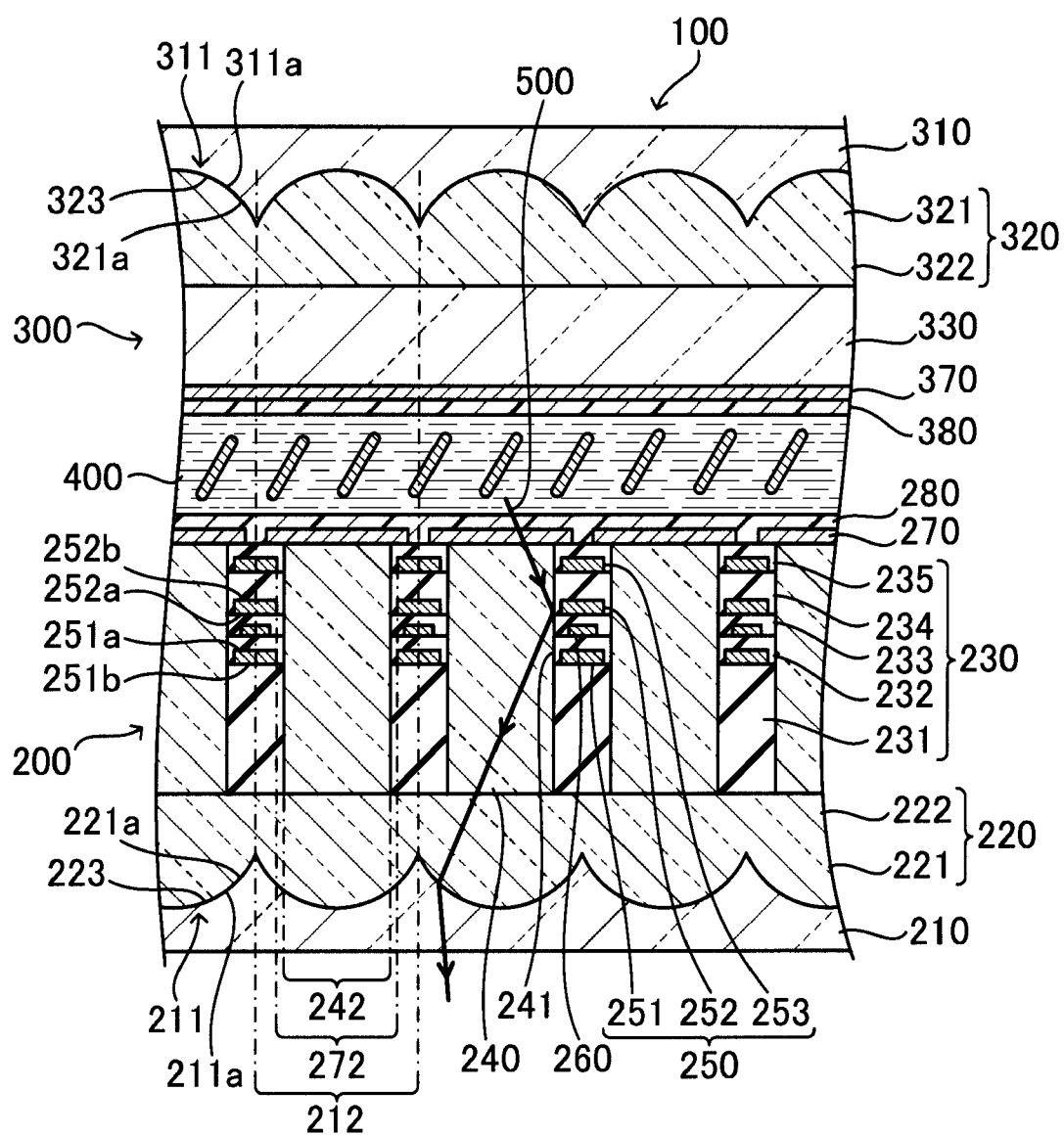
FIG. 3 is a schematic sectional view showing a configuration of the liquid crystal display device according to the embodiment.

FIG. 3 is a schematic sectional view showing an example of a configuration of the liquid crystal display device 100. Viewing the liquid crystal display device 100 in a direction (direction perpendicular to surface of pixel electrode 270 facing liquid crystal layer 400 side) perpendicular to the pixel electrode 270 is referred to as planar view. A direction perpendicular to the pixel electrode 270 may be referred to as a thickness direction. Viewing the liquid crystal display device 100 in a direction perpendicular to a plane on which a base member 210 of the element substrate 200 is formed or a direction perpendicular to a plane on which a base member 310 of the counter substrate 300 is formed may be referred to as planar view.

Hereinafter, for the convenience of description, with respect to the element substrate 200, the liquid crystal layer 400 side may be referred to as an upper side and with respect to the counter substrate 300, and the liquid crystal layer 400 side may be referred to as an upper side.

The element substrate 200 includes the base member 210, a lens member (microlens) 220, an insulating layer 231, an insulating layer 232, an insulating layer 233, an insulating layer 234, an insulating layer 235, a high refractive index insulator 240, a light shielding layer 251, a light shielding layer 252, a light shielding layer 253, a TFT 260, the pixel electrode 270, and an alignment film 280. On an upper side of the base member 210 (liquid crystal layer 400 side), the lens member 220, the insulating layer 231, and the like, the high refractive index insulator 240, the light shielding layer 251, the TFT 260, the pixel electrode 270, the alignment film 280, and the like are provided.

The base member 210 is formed of a material of light transmission that transmits visible light, for example, glass, quartz, or the like. A surface on an upper side (liquid crystal layer 400 side) of the base member 210 has a concave portion 211 having a concave curved surface 211*a*.

The lens member 220 is formed on the base member 210 covering the concave portion 211. The lens member 220 is formed of the material of the light transmission, for example, silicon oxynitride, silicon nitride, or the like. As the material (fourth material) forming the lens member 220, a material of which a refractive index with respect to the visible light is higher than the refractive index of the material (third material) forming the base member 210 is used.

The lens member 220 includes the lens layer 221 disposed in a range in the thickness direction in which the concave portion 211 is provided and a light transmission layer 222 disposed on the upper side (on high refractive index insulator 240 side) of the lens layer 221 in the thickness direction. The lens layer 221 is formed in contact with the concave portion 211 so as to fill the concave portion 211, forms an interface 223 with the concave portion 211, and includes a convex curved surface 221*a* corresponding to the concave curved surface 211*a* of the concave portion 211. A shape of the concave curved surface 211*a* of the concave portion 211, that is, a shape of the convex curved surface 221*a* of the lens layer 221 may be a spherical surface or an aspheric surface. The light transmission layer 222 is a flat plate portion of an upper side of the lens layer 221 in the lens member 220.

The insulating layer 231 is formed on the lens member 220. The insulating layer 231 is formed of a material insulation and light transmission, for example, silicon oxide or the like. The insulating layer 232, the insulating layer 233, the insulating layer 234, and the insulating layer 235 can also be formed by using the same material as the insulating layer 231.

The light shielding layer 251 is formed on the insulating layer 231. The light shielding layer 251 is formed of a light shielding material that shields the visible light, for example, polysilicon, metal, metal silicide, a metal compound, or the like. The light shielding layer 252 and the light shielding layer 253 can also be formed by using the same material as the light shielding layer 251.

The insulating layer 232 is formed on the insulating layer 231 covering the light shielding layer 251. The TFT 260 is formed on the insulating layer 232. The TFT 260 includes a semiconductor layer, and a source region, a channel region, and a drain region of the transistor are provided on the semiconductor layer. On the insulating layer 232 covering the TFT 260, the insulating layer 233 is formed. The light shielding layer 252 is formed on the insulating layer 233. As the light shielding layer 252, for example, the scanning line 261 (see FIG. 2) can be used. The insulating layer 234 is formed on the insulating layer 233 covering the light shielding layer 252. The light shielding layer 253 is formed on the insulating layer 234. As the light shielding layer 253, for example, the data line 262 (see FIG. 2) can be used. The insulating layer 235 is formed on the insulating layer 234 covering the light shielding layer 253.

The light shielding layer 251 (first light shielding layer) and the light shielding layer 252 (disposed in position different from light shielding layer 251 in thickness direction)(second light shielding layer) are overlapped with each other in the planar view. The TFT 260 (semiconductor element and switching element) is provided in a position in which the light shielding layer 251 and the light shielding layer 252 are overlapped with each other in the planar view, and provided between the light shielding layer 251 and the light shielding layer 252 in the thickness direction. The light shielding layer 253 overlaps with the light shielding layer 251 and the light shielding layer 252 in the planar view.

The insulating layer 231 is provided in the vicinity of the light shielding layer 251 in a lower side of the light shielding layer 251, the insulating layer 232 is provided in the vicinity of the light shielding layer 251 covering the light shielding layer 251, the insulating layer 233 is provided in the vicinity of the TFT 260 covering the TFT 260, the insulating layer 234 is provided in the vicinity of the light shielding layer 252 covering the light shielding layer 252, and the insulating layer 235 is provided in the vicinity of the light shielding layer 253 covering the light shielding layer 253.

On a region of the lens member 220 in which the insulating layer 231, the insulating layer 232, the insulating layer 233, the insulating layer 234, and the insulating layer 235 are not provided, the high refractive index insulator 240 is formed in a range of thickness up to a top surface of the insulating layer 235. The high refractive index insulator 240 is formed of the material of the insulation and the light transmission, for example, silicon oxynitride, silicon nitride, or the like. As a material (second material) forming the high refractive index insulator 240, a material of which the refractive index with respect to the visible light is higher than that of a material (first material) forming the insulating layer 231, the insulating layer 232, the insulating layer 233, the insulating layer 234, and the insulating layer 235 (low refractive index insulator 230 described later) is used. As a material forming the high refractive index insulator 240, for example, a material having the same refractive index as that of a material forming the lens member 220 can be used.

On a surface on which the insulating layer 235 and the high refractive index insulator 240 is formed, the pixel electrode 270 is formed. The pixel electrode 270 is formed of a material of conductivity and light transmission, for example, indium tin oxide (ITO), indium zinc oxide (IZO), or the like. On the insulating layer 235 and the high refractive index insulator 240 covering the pixel electrode 270, the alignment film 280 is formed. The alignment film 280 is formed of, for example, polyimide, silicon oxide, or the like.

An insulating layer or having the refractive index lower than that of the high refractive index insulator 240 which is provided in a range in the thickness direction in which the high refractive index insulator 240 (second insulator) is disposed and provided in contact with the high refractive index insulator 240 in the planar view, is collectively referred to as a low refractive index insulator 230 (first insulator). In this example, the insulating layer including the insulating layer 231, the insulating layer 232, the insulating layer 233, the insulating layer 234, and the insulating layer 235 collectively form the low refractive index insulator 230. In addition, the light shielding layer 251, the light shielding layer 252, and the light shielding layer 253 are collectively referred to as a light shielding member 250.

The counter substrate 300 includes the base member 310, the lens member (microlens) 320, an insulating layer 330, the common electrode 370, and an alignment film 380. On an upper side of the base member 310 (on liquid crystal layer 400 side), the lens member 320, the insulating layer 330, the common electrode 370, and the alignment film 380 are provided.

The base member 310 is formed of the material of the light transmission, for example, the glass, the quartz, or the like. A surface of an upper side (liquid crystal layer 400 side) of the base member 310 includes a concave portion 311 including a concave curved surface 311a. The lens member 320 is formed on the base member 310 covering the concave portion 311. The lens member 320 is formed of the material of the light transmission, for example, silicon oxynitride, silicon nitride, or the like, having a refractive index higher than that of a material forming the base member 310 with respect to the visible light.

The lens member 320 includes a lens layer 321 disposed in a range in the thickness direction in which the concave portion 311 is provided and a light transmission layer 322 disposed on an upper side of the lens layer 321 in the thickness direction. The lens layer 321 includes a convex curved surface 321a in contact with the concave portion 311 by being formed to fill the concave portion 311, which forms an interface 323 with the concave portion 311, and corresponds to the concave curved surface 311a of the concave portion 311. A shape of the concave curved surface 311a including the concave portion 311, that is, a shape of the convex curved surface 321a including the lens layer 321 may be the spherical surface or the aspheric surface. The light transmission layer 322 is a flat plate portion of an upper side of the lens layer 321 in the lens member 320.

The insulating layer 330 is formed on the lens member 320. The insulating layer 330 is formed of the material of the insulation and the light transmission, for example, silicon oxide or the like. The common electrode 370 is formed on the insulating layer 330. The common electrode 370 is formed of the material of the conductivity and the light transmission, for example, ITO, IZO, of the like. The alignment film 380 is formed on the common electrode 370. The alignment film 380 is formed of, for example, polyimide, silicon oxide, or the like.

Figure 4:
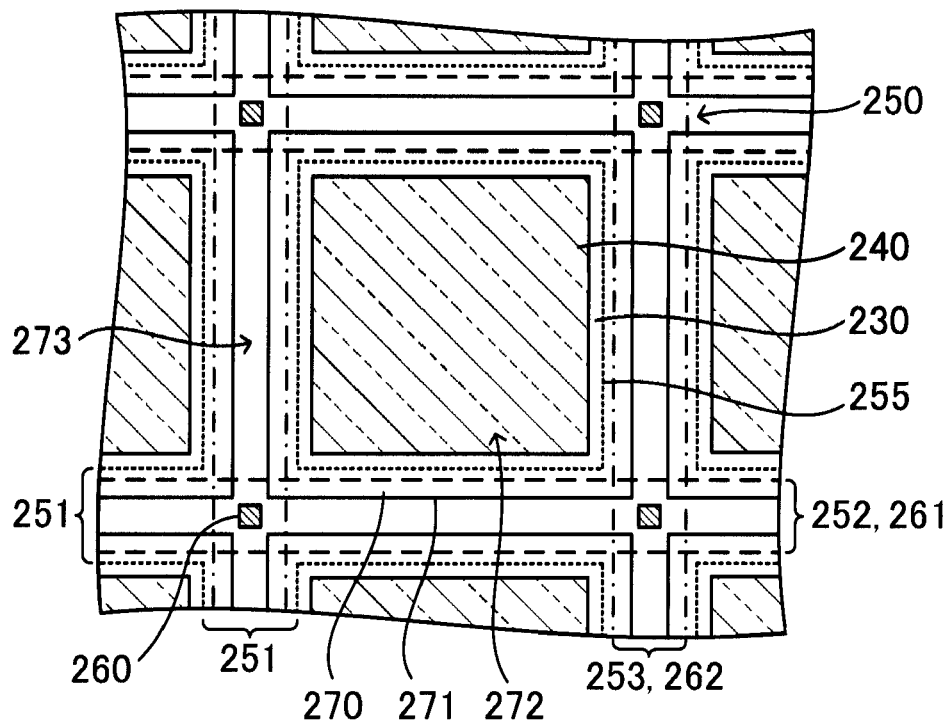
FIG. 4 is a schematic planar view showing a configuration in the vicinity of a pixel electrode.

FIG. 4 is a schematic planar view showing an example of a configuration in the vicinity of the pixel electrode 270, and shows a positional relationship between the low refractive index insulator 230, the high refractive index insulator 240, the light shielding member 250, the TFT 260, and the pixel electrode 270 in the planar view. FIG. 3 is a sectional view obtained by selecting an appropriate position (path) in the planar view so as to show a schematic configuration of the base member 210, the lens member 220, the low refractive index insulator 230, the high refractive index insulator 240, the light shielding member 250, the TFT 260, and the pixel electrode 270, in a sectional view taken in a direction perpendicular to the thickness direction.

In FIG. 4, the pixel electrode 270 is indicated by a solid line. The light shielding layer 251 is indicated by a dotted line, the light shielding layer 252 formed by the scanning line 261 is indicated by a broken line, and the light shielding layer 253 formed by the data line 262 is indicated by a dashed line. The high refractive index insulator 240 is indicated by a hatched region in which a solid line and a dashed line in left upward are alternately repeated, and the low refractive index insulator 230 is indicated by a non-hatched (white) region (open region). The TFT 260 is indicated by a region hatched by a solid line in left upward.

Here, the direction along one side where the data line driving circuit 110 (see FIG. 1) is provided is an X direction, and two sides opposed to each other and perpendicular to the one side, that is, a direction along two sides in which the scanning line driving circuit 130 (see FIG. 1) is provided is a Y direction. As a direction perpendicular to the X direction and the Y direction is a Z direction, viewing the liquid crystal display device 100 from the Z direction may be referred to as the planar view.

The pixel electrode 270 is a rectangular shape having a pair of sides extending in the X direction and another pair of sides extending in the Y direction. A plurality of the pixel electrodes 270 are arranged in a matrix so that a row extending in the X direction and a column extending in the Y direction are formed.

The light shielding layer 251 is provided in a mesh shape so as to cover a gap extending in the X direction between rows of the pixel electrodes 270 and a gap extending the Y direction between columns of the pixel electrodes 270 in the Y direction. The light shielding layer 251 is provided to cover an edge portion of the pixel electrode 270, and the gap between the pixel electrodes 270 adjacent in the X direction and the gap between the pixel electrodes 270 adjacent in the Y direction are covered with the light shielding layer 251 over the entire width.

The light shielding layer 252 (scanning line 261) is provided to cover the gap extending between the rows of the pixel electrode 270 in the X direction. The light shielding layer 252 is provided to cover an edge of the pixel electrode 270, and a gap between the pixel electrodes 270 adjacent in the Y direction is covered with the light shielding layer 252 over the entire width.

The light shielding layer 253 (data line 262) is provided to cover the gap extending the Y direction between the rows of the pixel electrodes 270. The light shielding layer 253 is provided to cover the edge portion of the pixel electrode 270, and the gap between the pixel electrodes 270 adjacent in the X direction is covered with the light shielding layer 253 over the entire width.

Therefore, the light shielding member 250 including the light shielding layer 251, the light shielding layer 252, and the light shielding layer 253 are provided in a mesh shape so as to cover the gap extending between the rows of the pixel electrode 270 in the X direction, and the gap extending between the rows of the pixel electrodes 270 in the Y direction. The light shielding member 250 is provided to cover the edge portion of the pixel electrode 270, the gap between the pixel electrodes 270 adjacent in the X direction and the gap between the pixel electrodes 270 adjacent in the Y direction are covered with the light shielding member 250 over the entire width.

The light shielding member 250 is provided along (to overlap with edge 271) an edge 271 of the pixel electrode 270 in the planar view, and an opening region 272 (surrounded by edge 255 of light shielding member 250) surrounded by the light shielding member 250 is a light transmission region through which light is transmitted without being blocked by the light shielding member 250. The non-opening region 273 disposed outside the opening region 272 is a region overlapping with the light shielding member 250 and is a light shielding region in which the light is shielded.

The TFT 260 is disposed in a position in which the light shielding layer 252 that is the scanning line 261 and the light shielding layer 253 that is the data line 262 are overlapped (intersected) with each other, and provided in a region overlapping with the light shielding member 250.

The low refractive index insulator 230 is provided in a region overlapping with at least the light shielding member 250. The high refractive index insulator 240 is provided in contact with the low refractive index insulator 230 on the opening region 272.

More preferably, the low refractive index insulator 230 is provided to extend from the edge 255 of the light shielding member 250 to the outside (inside opening region 272), and cover an end surface of the light shielding layer 251 and the light shielding layer 252 (see FIG. 3). Correspondingly, the high refractive index insulator 240 is more preferably disposed so as to be separated from the edge 255 of the light shielding member 250 to the inside of the opening region 272, and provided so as not to be in contact with the light shielding member 250. In this manner, the high refractive index insulator 240 is provided so as to be in contact with the low refractive index insulator 230 over the entire circumference of the opening region 272.

Furthermore, with reference to FIG. 3, FIG. 5, and FIG. 6, a positional relationship between the concave portion 211 of the base member 210 and the high refractive index insulator 240 will be described. As described in FIG. 3, a region 242 in which the high refractive index insulator 240 is disposed is disposed inside the opening region 272. A region 212 in which the concave portion 211 is disposed is disposed to the outside of the opening region 272 so as to overlap with the opening region 272 and the concave portion 211 is disposed to the outside of the high refractive index insulator 240 overlapping with the high refractive index insulator 240 in the planar view.

Figure 5:
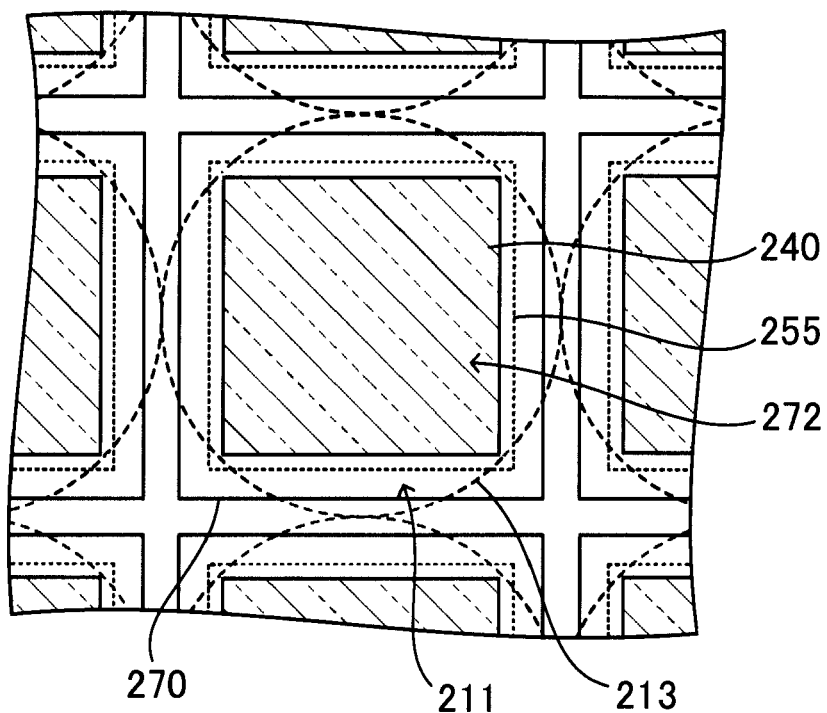
FIG. 5 is a schematic planar view showing a disposition in an edge of a concave portion included in a base member of an element substrate.
Figure 6:
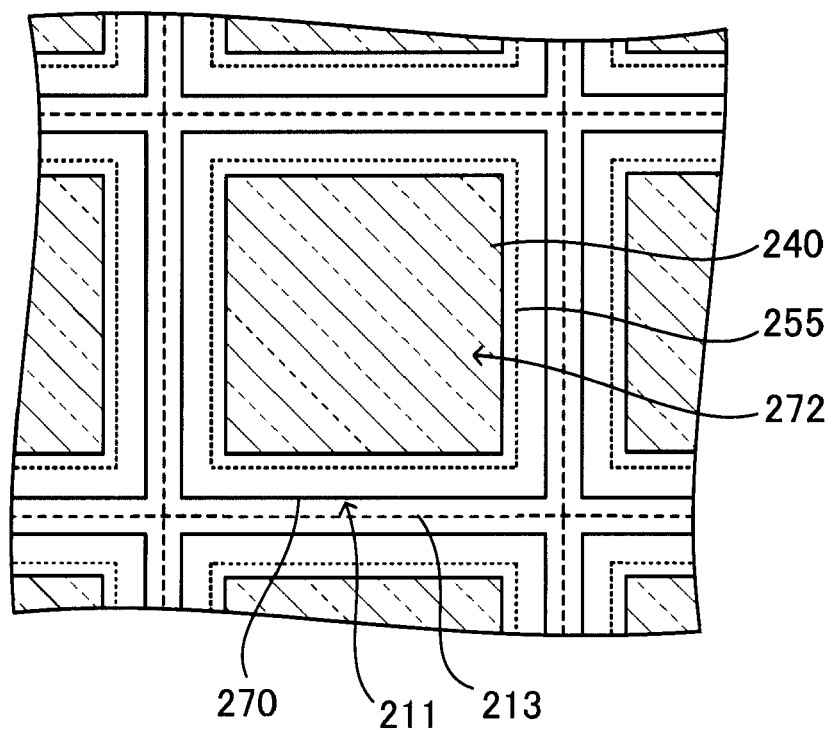
FIG. 6 is a schematic planar view showing another disposition in the edge of the concave portion included in the base member of the element substrate.

FIG. 5 and FIG. 6 are schematic planar views showing an example of disposition of an edge 213 of the concave portion 211. The edge 255 of the light shielding member 250 defining the edge 213 of the concave portion 211 and the pixel electrode 270, the high refractive index insulator 240, and the opening region 272 are shown. The concave portion 211 is provided for each pixel electrode 270, and disposed in a matrix. A shape of the edge 213 of the concave portion 211 in the planar view is not particularly limited, and may be, for example, a circular shape, or may be, for example, a quadrilateral shape. FIG. 5 shows an example of a case where the edge 213 is the circular shape and FIG. 6 shows an example of a case where the edge 213 is the quadrilateral shape.

In a portion in which the edge 213 is disposed outside the high refractive index insulator 240, the concave portion 211 is disposed outside the high refractive index insulator 240. The entire periphery of the edge 213 may not be disposed outside the high refractive index insulator 240. That is, at least a part of the circumference of the concave portion 211 in the planar view may be disposed outside the high refractive index insulator 240. The concave portion 211 includes a portion disposed outside the high refractive index insulator 240, and a portion disposed outside the opening region 272 (edge 255).

With reference to FIG. 3 and FIG. 4, a function of the high refractive index insulator 240 as a waveguide and a function of the lens member 220 will be described. In the liquid crystal display device 100, a traveling direction is aligned in a direction appropriately perpendicular to the pixel electrode 270 such that light appropriately converted into parallel light flux is incident, but the incident light also includes a component that is obliquely incident while being shifted from a direction perpendicular to the pixel electrode 270.

Here, as an example of a case where light is incident on the liquid crystal display device 100 from the counter substrate 300 side, a function as the waveguide of the high refractive index insulator 240 for incident light 500 obliquely incident on the opening region 272 will be described. The incident light perpendicularly incident on the opening region 272 travels straight in the opening region 272.

The incident light 500 obliquely incident on the opening region 272 transmits the alignment film 280 and the pixel electrode 270, is incident on the high refractive index insulator 240, and is incident on the interface 241 between the high refractive index insulator 240 and the low refractive index insulator 230. The interface 241 is provided to be perpendicular to the pixel electrode 270. It is not essential for an actual device to be vertical (90°) without error, and an angle formed by the interface 241 with respect to the pixel electrode 270 (with respect to plane parallel to pixel electrode 270) may be an angle close to vertical, for example, an angle within a range of 90°±10°. Since the angle of the interface 241 is an angle close to vertical, total reflection described below is likely to occur at the interface 241.

For example, in a case where the low refractive index insulator 230 is formed of silicon oxide and the high refractive index insulator 240 is formed of the silicon oxynitride, for visible light of wavelength 550 nm, the refractive index of the low refractive index insulator 230 is 1.46 and the refractive index of the high refractive index insulator 240 is 1.64. In this example, according to Snell's law, when the incident angle of the incident light 500 incident on the interface 241 is 62° or more, that is, when the incident angle to the pixel electrode 270 is 28° (=90°−62°) or less, the incident light 500 is totally reflected at the interface 241 and not incident on the low refractive index insulator 230. Therefore, the incident light 500 is not incident on the non-opening region 273 that is a region in which the light shielding member 250 is provided in the planar view.

As described above, the high refractive index insulator 240 functions as the waveguide which reflects light incident on the opening region 272 (on high refractive index insulator 240) at the interface 241 between the high refractive index insulator 240 and the low refractive index insulator 230, and propagates the light inside the high refractive index insulator 240. By causing total reflection at the interface 241, it is possible to efficiently propagate the incident light 500 inside the high refractive index insulator 240. Even in a case where reflection other than total reflection occurs at the interface 241, it is possible to return at least a part of the incident light 500 to the inside of the high refractive index insulator 240, that is, to the inside of the opening region 272 by the reflection.

The lens member 220 is disposed between the high refractive index insulator 240 and the base member 210 in the thickness direction. The high refractive index insulator 240 and the lens member 220 of this example are disposed in contact with each other in the thickness direction.

The incident light 500 incident on the lens member 220 by transmitting the high refractive index insulator 240 transmits the lens member 220 and is incident on the base member 210. The incident light 500 is refracted at the interface 223 between the lens member 220 and the concave portion 211 of the base member 210, and can be traveled toward the inside of the opening region 272, that is, to approach in a direction perpendicular with respect to the pixel electrode 270, as compared to a case where it is not refracted at the interface 223.

Since the concave portion 211 is disposed to the outside of the high refractive index insulator 240 and the lens member 220 (lens layer 221) is formed by being extended to the outside of the high refractive index insulator 240, it is possible to travel the incident light 500 passing through a wide range toward the inside of the opening region 272, as compared to a case where the lens member 220 (lens layer 221) is not formed to the outside of the high refractive index insulator 240.

As described above, in the liquid crystal display device 100, by providing the high refractive index insulator 240, since it is possible to suppress the incident light 500 from being deviated from the opening region 272 as compared to a case where the high refractive index insulator 240 is not provided, it is suppressed that the incident light 500 does not contribute to display and light utilization efficiency is improved. In addition, since it is possible to suppress irradiation of the incident light 500 on the TFT 260 (particularly, on semiconductor layer TFT 260) provided in a position overlapped with the light shielding member 250 in the planar view, an erroneous operation of the TFT 260 is suppressed. In this manner, it is possible to improve the light utilization efficiency and the like with a simple structure in which the high refractive index insulator 240 is provided on the opening region 272.

Furthermore, by the lens member 220 provided to cover the concave portion 211 disposed to the outside of the high refractive index insulator 240 in the planar view, since the incident light 500 passing through the outside of the high refractive index insulator 240 can also be refracted (returned to inside of opening region 272) to the inside of the opening region 272, it is possible to further improve the light utilization efficiency. For example, in a projector 700 of an application example (which will be described below), it becomes easy to cause light to be incident on a projection optical system 714.

Even in a case where light is incident on the liquid crystal display device 100 from the element substrate 200 side, similar to a case where light is incident from the counter substrate 300 side, the light can be prevented from being incident on the low refractive index insulator 230 by the high refractive index insulator 240. With this, the light utilization efficiency is improved and the irradiation of the incident light 500 to the TFT 260 is suppressed. By the high refractive index insulator 240, an effect of suppressing the TFT 260 from being irradiated with light that is reflected by a polarizing plate and again incident on the element substrate 200 is also obtained.

In addition, for a case where light is incident on the liquid crystal display device 100 from the element substrate 200 side, light incident on the lens member 220 from a base member 210 side is refracted to the inside of the opening region 272 at the interface 223. With this, since light that is incident on the light shielding member 250 (non-opening region 273) is suppressed, it is possible to cause light to be incident on the high refractive index insulator 240 and it is possible to further improve the light utilization efficiency.

In this example, the high refractive index insulator 240 and the lens member 220 are in contact with each other in the thickness direction. As the high refractive index insulator 240 reaches the lens member 220, it is possible to directly cause light incident on the lens member 220 from the high refractive index insulator 240, or it is possible to directly cause the light incident on the high refractive index insulator 240 from the lens member 220.

The lens member 220 includes the light transmission layer 222 in addition to the lens layer 221. By adjusting a thickness of the light transmission layer 222 of the lens member 220, it is possible to adjust an optical path length of light transmitting the opening region 272.

A range in which the high refractive index insulator 240 is disposed in the thickness direction, it is preferable that the range include a range in the TFT 260 (particularly, semiconductor layer of TFT 260) is disposed in the thickness direction. More specifically, it is preferable that the range include a range from a surface 251*a* facing a TFT 260 side of the light shielding layer 251 to a surface 252*a* facing a TFT 260 side of the light shielding layer 252 in the thickness direction. By providing the high refractive index insulator 240 in this manner, it is possible to suppress the irradiation of the incident light to the TFT 260.

It is preferable that a range in which the high refractive index insulator 240 is disposed in the thickness direction include a range from the surface 251*a* facing the TFT 260 side of the light shielding layer 251 to the surface 252*a* facing the TFT 260 side of the light shielding layer 252 in the thickness direction, even in a portion in which the high refractive index insulator 240 is provided in the planar view. With this, it is possible to further enhance the effect of suppressing the irradiation of the incident light to the TFT 260.

It is more preferable that a range in which the high refractive index insulator 240 is disposed in the thickness direction include a range from a surface 251b opposite to the surface 251a facing the TFT 260 side of the light shielding layer 251 to a surface 252b opposite to the surface 252a facing the TFT 260 side of the light shielding layer 252 in the thickness direction. With this, it is possible to further enhance the effect of suppressing the irradiation of the incident light to the TFT 260.

It is more preferable that the high refractive index insulator 240 be disposed to be separated from the edge 255 of the light shielding member 250 inside the opening region 272 and provided in contact with the low refractive index insulator 230 in the planar view. This is due to the following reason.

Since the high refractive index insulator 240 is separated from the light shielding member 250, the light shielding member 250 is not in contact with the high refractive index insulator 240 and not exposed in the high refractive index insulator 240. The light shielding member 250 is made of metal, for example, and includes metallic luster. When the light shielding member 250 is exposed inside the high refractive index insulator 240, light propagating through the high refractive index insulator 240 is reflected by an edge of an end portion of the light shielding layer 251 or the like forming the light shielding member 250.

As the traveling direction of the incident light 500 incident on the interface 241 is closer to parallel with the interface 241 (as incident angle to interface 241 is close to 90°), the total reflection at the interface 241 is likely to occur. However, since the light reflected at an edge of an end portion of the light shielding member 250 is not constant in a reflection direction, there is a possibility that reflected light having a small incident angle to the interface 241 (reflected light of which traveling direction is close to perpendicular to interface 241) occurs. Such reflected light is incident on the low refractive index insulator 230 and propagated by being deviated the opening region 272, and is more likely to be irradiated on the TFT 260.

By configuring the high refractive index insulator 240 to be separated from the light shielding member 250, it is possible to suppress reflection of the incident light 500 by an edge the light shielding member 250. Even in a configuration where the high refractive index insulator 240 is in contact with the light shielding member 250, by providing the high refractive index insulator 240, as compared to a case where the high refractive index insulator 240 is not provided, it is possible to obtain the effect of improving the light utilization efficiency and suppressing the light irradiation on the TFT 260 as described above.

Figure 7:
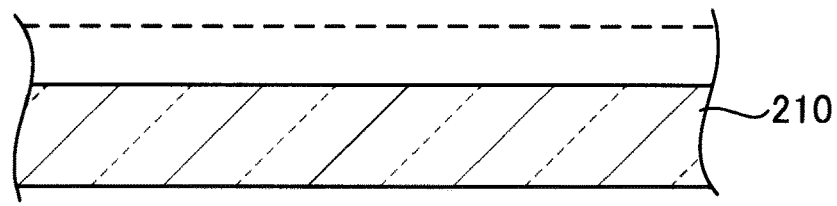
FIG. 7 is a schematic sectional view showing a manufacturing process of the liquid crystal display device according to the embodiment.

Next, a manufacturing method of the liquid crystal display device 100 will be described. FIG. 7 to FIG. 13 are schematic sectional views showing a manufacturing process of the liquid crystal display device 100. FIG. 7 is referred. The base member 210 is prepared. In the base member 210, a mask having an opening on a region in which the lens member 220 is formed is formed, and a part of a thickness of the base member 210 in the region is removed by etching. For this etching, for example, wet etching using an etching solution containing hydrofluoric acid is used. Thereafter, the mask is removed.

Figure 8:
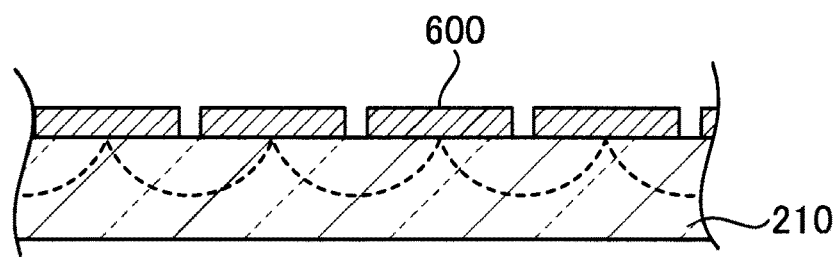
FIG. 8 is a schematic sectional view showing another manufacturing process of the liquid crystal display device according to the embodiment.
Figure 9:
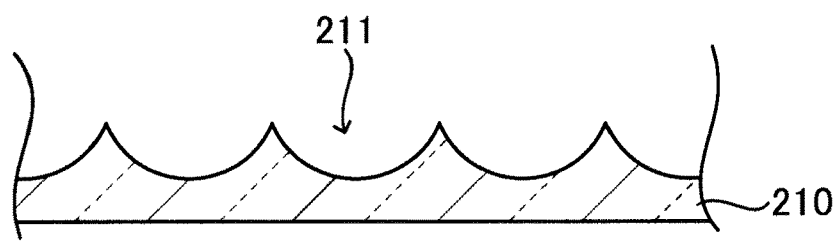
FIG. 9 is a schematic sectional view showing still another manufacturing process of the liquid crystal display device according to the embodiment.

FIG. 8 is referred. A mask 600 having an opening over the deepest portion of the concave portion 211 to be formed on the base member 210 is formed. FIG. 9 is referred. For example, by performing the wet etching using the etching solution containing the hydrofluoric acid, the concave portion 211 is formed. After the concave portion 211 is formed, the mask 600 is removed.

Figure 10:
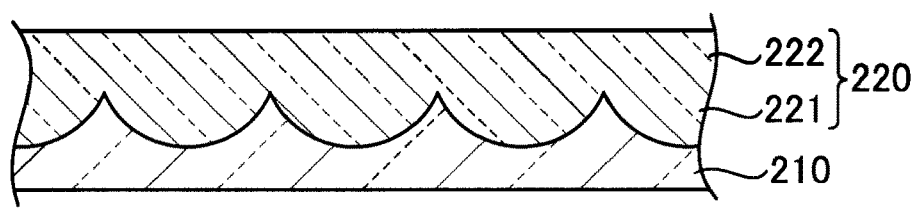
FIG. 10 is a schematic sectional view showing still another manufacturing process of the liquid crystal display device according to the embodiment.

FIG. 10 is referred. In order to fill the concave portion 211, for example, silicon oxynitride is deposited by plasma chemical vapor deposition (CVD), unnecessary portions are removed by chemical mechanical polishing (CMP), and the upper surface is planarized. In this manner, the lens member 220 is formed.

Figure 11:
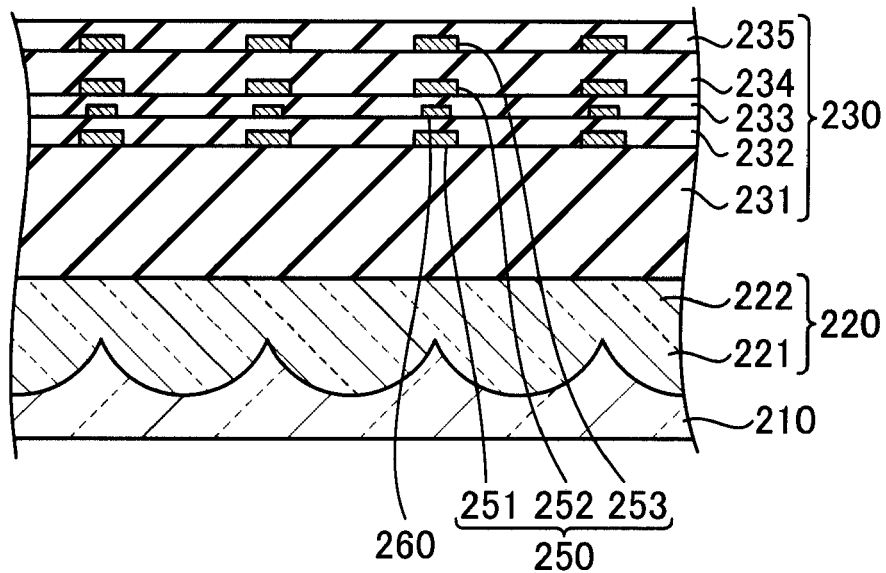
FIG. 11 is a schematic sectional view showing still another manufacturing process of the liquid crystal display device according to the embodiment.

FIG. 11 is referred. The insulating layer 231 is formed on the lens member 220. The light shielding layer 251 is formed on the insulating layer 231, and the insulating layer 232 is formed on the insulating layer 231 covering the light shielding layer 251. The TFT 260 is formed on the insulating layer 232, and the insulating layer 233 is formed on the insulating layer 232 covering the TFT 260. The light shielding layer 252 is formed on the insulating layer 233 and the insulating layer 234 is formed on the insulating layer 233 covering the light shielding layer 252. The light shielding layer 253 is formed on the insulating layer 234 and the insulating layer 235 is formed on the insulating layer 234 covering the light shielding layer 253. As a formation method of the insulating layer 231, the insulating layer 232, the insulating layer 233, the insulating layer 234, the insulating layer 235, the light shielding layer 251, the light shielding layer 252, the light shielding layer 253, and the TFT 260, known methods can be appropriately used.

Figure 12:
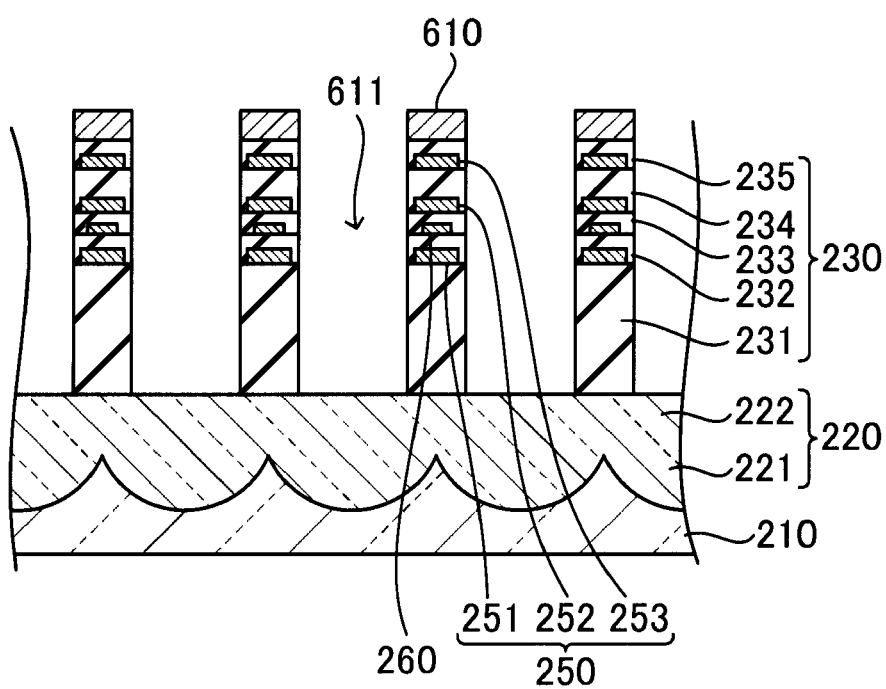
FIG. 12 is a schematic sectional view showing still another manufacturing process of the liquid crystal display device according to the embodiment.

FIG. 12 is referred. On the insulating layer 235, a mask 610 having an opening on a formation region of the high refractive index insulator 240 is formed. The insulating layer 235, the insulating layer 234, the insulating layer 233, the insulating layer 232, and the insulating layer 231 are formed of, for example, silicon oxide. The insulating layer 235, the insulating layer 234, the insulating layer 233, the insulating layer 232, and the insulating layer 231 in an opening of the mask 610 are removed by dry etching using a halogen-based etching gas such as fluorine such that a concave portion 611 is formed in the insulating layer 235, the insulating layer 234, the insulating layer 233, the insulating layer 232, and the insulating layer 231. After the concave portion 611 is formed, the mask 610 is removed.

Figure 13:
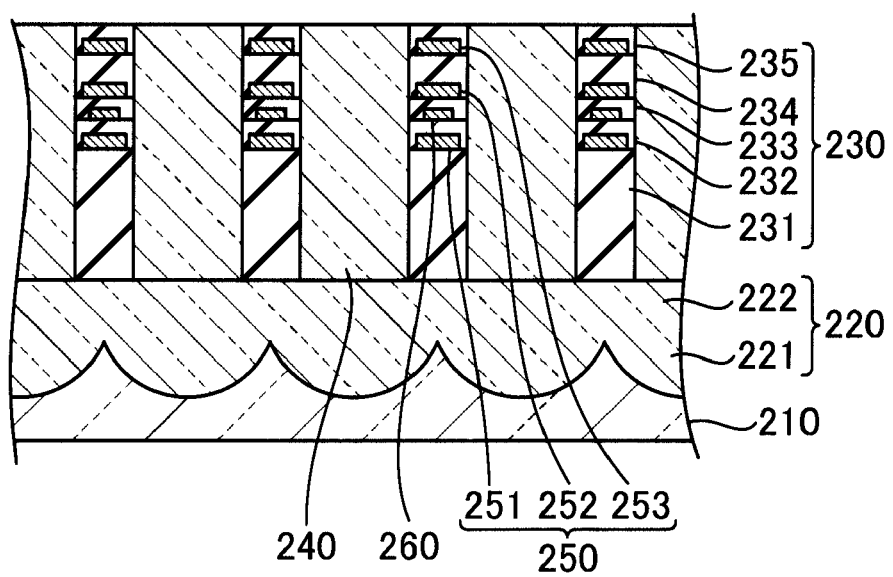
FIG. 13 is a schematic sectional view showing still another manufacturing process of the liquid crystal display device according to the embodiment.

FIG. 13 is referred. In order to fill the concave portion 611, for example, silicon oxynitride is deposited by plasma CVD, and unnecessary portions are removed by CMP such that the upper surface is planarized. In this manner, the high refractive index insulator 240 buried in the concave portion 611 is formed. The high refractive index insulator 240 according to the present embodiment can be easily manufactured by burying the concave portion 611.

Thereafter, a structure on the upper side (liquid crystal layer 400 side) than the insulating layer 235 and the high refractive index insulator 240 is formed by appropriately using a known method such that the element substrate 200 is formed. Furthermore, the counter substrate 300 is formed by appropriately using a known technology and the liquid crystal layer 400 is formed such that the liquid crystal display device 100 is manufactured.

Another Embodiment

The invention is not limited to the above-described embodiments, but can be applied to other embodiments as described below, for example, and various modifications are possible. In addition, in the other embodiments and modifications described below, one or a plurality of arbitrarily selected ones can be appropriately combined.

Second Embodiment

A range in which the high refractive index insulator 240 in which the waveguide is formed is provided in the thickness direction may be changed as necessary. In the first embodiment, an example of a configuration in which the high refractive index insulator 240 is provided between a surface of a lower side (side opposite to liquid crystal layer 400) of the insulating layer 231 and a surface of an upper side (liquid crystal layer 400 side) of the insulating layer 235, that is, a configuration in which the high refractive index insulator 240 is in contact with the lens member 220 and the pixel electrode 270, is described.

Figure 14:
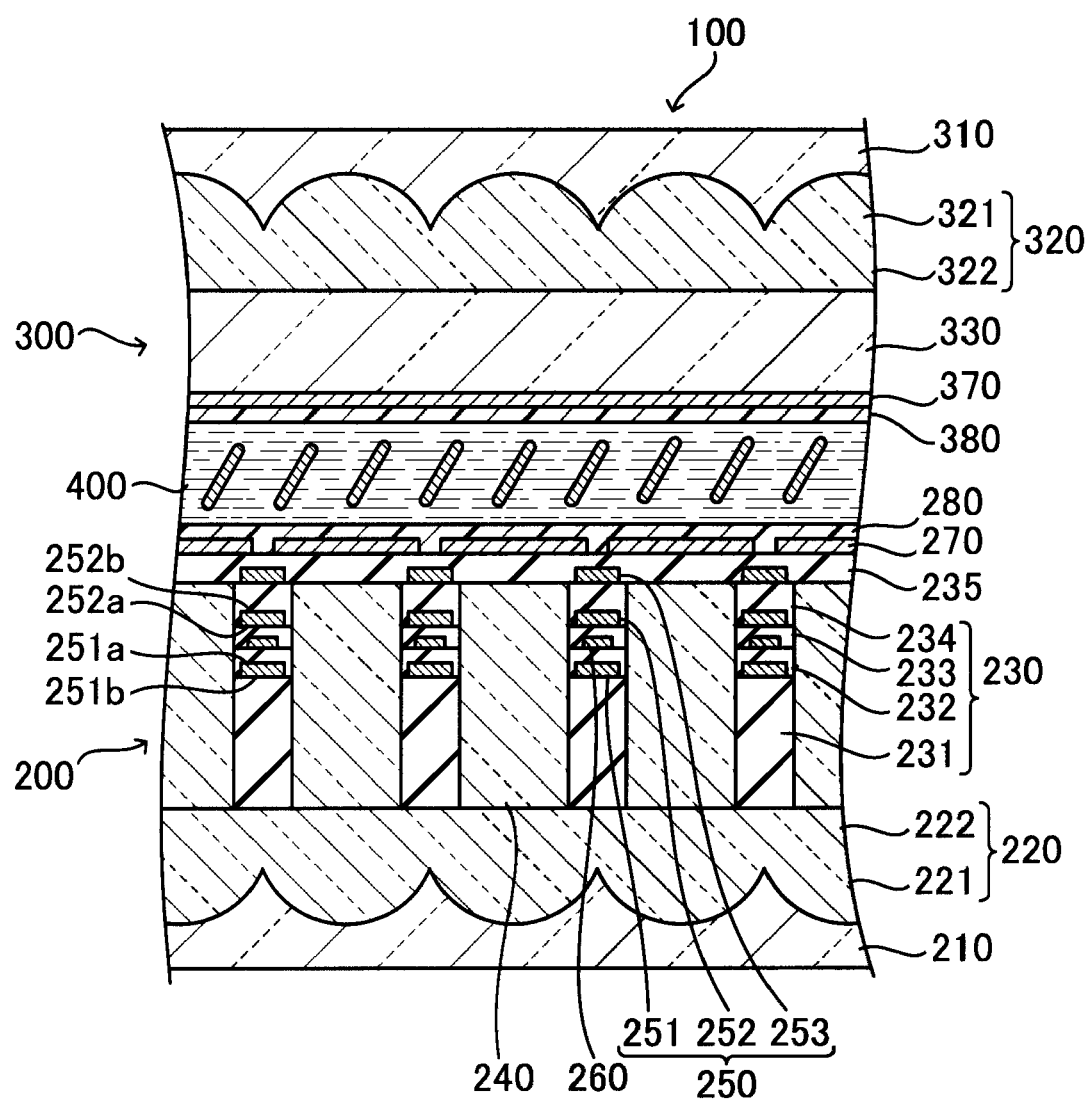
FIG. 14 is a schematic sectional view showing a configuration of a liquid crystal display device according to a second embodiment.

FIG. 14 is a schematic sectional view showing an example of a configuration the liquid crystal display device 100 according to the second embodiment. In the second embodiment, a configuration in which the high refractive index insulator 240 is provided between a surface of a lower side of the insulating layer 231 and a surface of an upper side of the insulating layer 234, that is, a configuration in which the high refractive index insulator 240 is in contact with the lens member 220, and not in contact with the pixel electrode 270, is provided.

Third Embodiment

Figure 15:
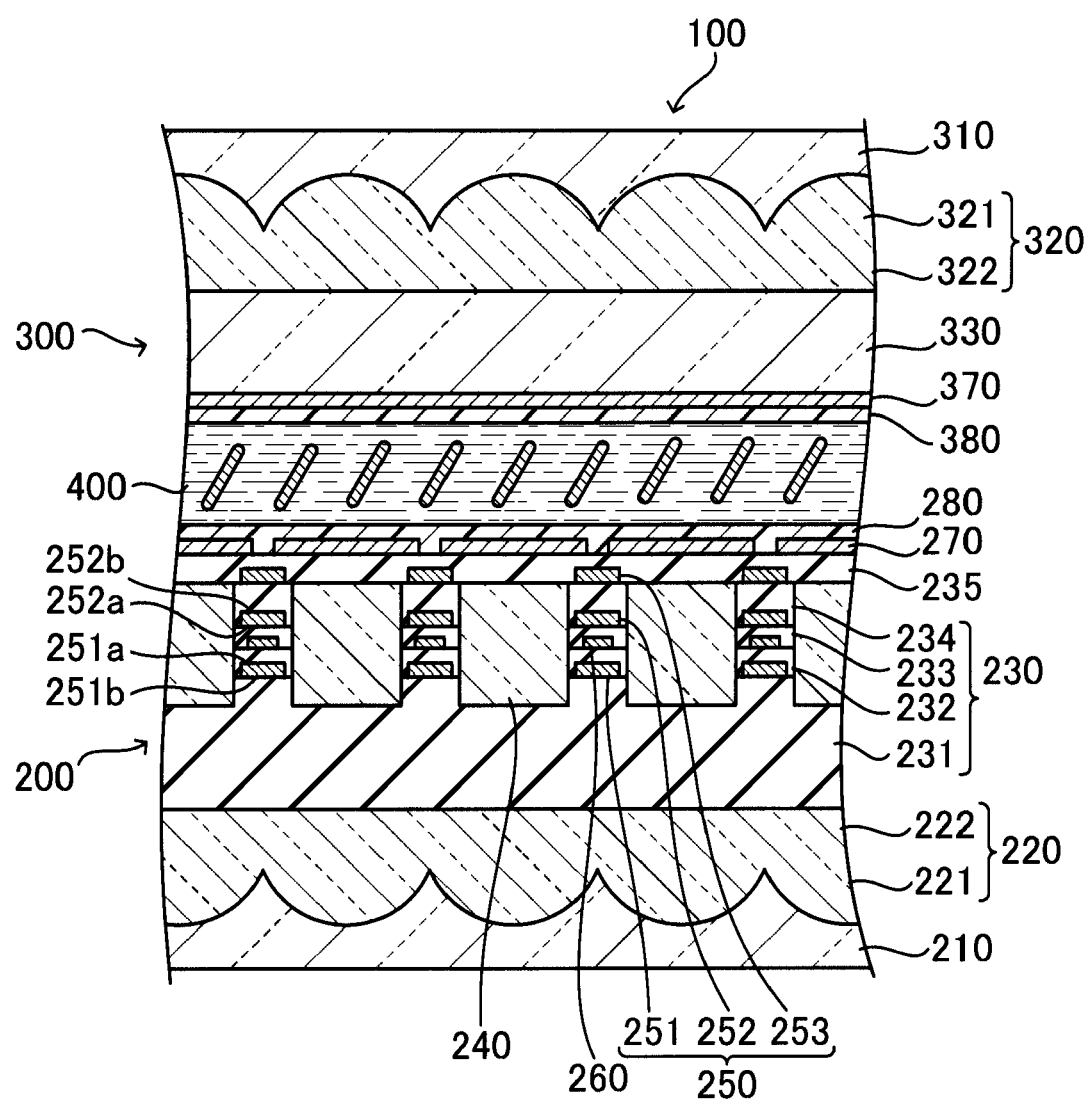
FIG. 15 is a schematic sectional view showing a configuration of a liquid crystal display device according to a third embodiment.

FIG. 15 is a schematic sectional view showing an example of a configuration of the liquid crystal display device 100 according to the third embodiment. In the third embodiment, a configuration in which the high refractive index insulator 240 is provided between a position in the thickness direction of the insulating layer 231 and a surface of an upper side of the insulating layer 234, that is, a configuration in which the high refractive index insulator 240 is not in contact with the lens member 220 and the pixel electrode 270, is provided.

Fourth Embodiment

Figure 16:
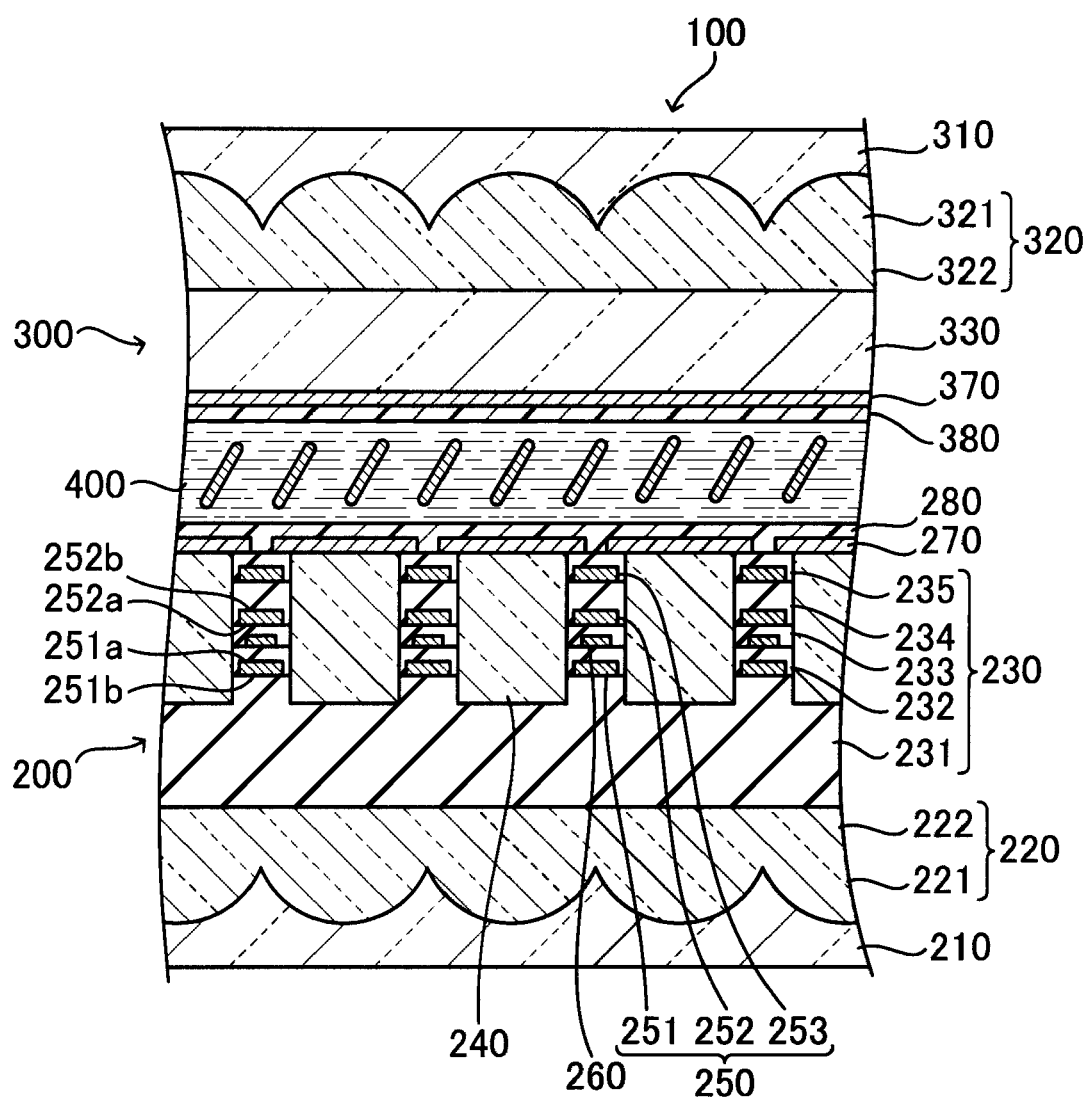
FIG. 16 is a schematic sectional view showing a configuration of a liquid crystal display device according to a fourth embodiment.

FIG. 16 is a schematic sectional view showing an example of a configuration of the liquid crystal display device 100 according to a fourth embodiment. In the fourth embodiment, the configuration in which the high refractive index insulator 240 is provided between the position in the thickness direction of the insulating layer 231 and the surface of the upper side of the insulating layer 235, that is, a configuration in which the high refractive index insulator 240 is not in contact with the lens member 220, and in contact with the pixel electrode 270, is provided.

Even in the second embodiment to the fourth embodiment, it is possible to obtain the same effect as the first embodiment, respectively. That is, by the high refractive index insulator 240, the light utilization efficiency is improved and the light irradiation on the TFT 260 is suppressed. In addition, the light utilization efficiency is further improved by the lens member 220.

A range in which the high refractive index insulator 240 is provided in the thickness direction can be adjusted by changing a formation range of the concave portion 611 in which the high refractive index insulator 240 described in FIG. 12, is provided. In the second embodiment, by forming the mask 610 on the insulating layer 234 and by etching to an upper surface of the lens member 220, the concave portion 611 is provided. In the third embodiment, by forming the mask 610 on the insulating layer 234 and by etching the mask 610 to a position of the insulating layer 231 in the thickness direction, the concave portion 611 is provided. In the fourth embodiment, by forming the mask 610 on the insulating layer 235 and by etching to a position of the insulating layer 231 in the thickness direction, the concave portion 611 is provided. The etching to the position of the insulating layer 231 in the thickness direction is performed by controlling, for example, an etching time, or, for example, by providing an etching stopper layer formed of the material of the light transmission at the position of the insulating layer 231 in the thickness direction.

In the first embodiment, a configuration in which the high refractive index insulator 240 is provided in a range of the total thickness between the lens member 220 and the pixel electrode 270. On the other hand, in the second embodiment to fourth embodiment, the high refractive index insulator 240 is provided in a range of a part of the thickness between the lens member 220 and the pixel electrode 270. Therefore, the concave portion 611 in which the high refractive index insulator 240 is provided becomes shallower as compared to first embodiment and a process of forming the concave portion 611 becomes easier. In addition, a process for filling a material forming the high refractive index insulator 240 in the concave portion 611 becomes easier.

In the second embodiment, similar to the first embodiment, the high refractive index insulator 240 and the lens member 220 are in contact with each other in the thickness direction. Therefore, similar to the first embodiment, it is possible to cause light to be directly incident on the lens member 220 from the high refractive index insulator 240, or to cause the light to be directly incident on the high refractive index insulator 240 from the lens member 220.

In the third embodiment, the high refractive index insulator 240 and the lens member 220 are separated from each other in the thickness direction. Therefore, it is not necessary to form the high refractive index insulator 240 up to a thickness (depth) reaching the lens member 220, and it is easy to form the high refractive index insulator 240 as compared to the second embodiment, and it is easy to form the high refractive index insulator 240, as compared to the second embodiment. The fourth embodiment as compared to the first embodiment also has similar features.

In the third embodiment, the high refractive index insulator 240 and the pixel electrode 270 are separated from each other in the thickness direction. Therefore, it is not necessary to form the high refractive index insulator 240 up to a thickness (depth) reaching the pixel electrode 270, and it is easy to form the high refractive index insulator 240 as compared to the fourth embodiment, and it is easy to form the high refractive index insulator 240, as compared to the fourth embodiment. The second embodiment as compared to the first embodiment also has similar features.

As the third embodiment and the fourth embodiment, in a configuration in which the high refractive index insulator 240 and the lens member 220 are separated from each other, it is preferable that the high refractive index insulator 240 be not excessively separated from the lens member 220 in the thickness direction, and it is preferable that the high refractive index insulator 240 be disposed to a position close to the lens member 220 with respect to, for example, the light shielding member 250 (with respect to position disposed closest to lens member 220 side of light shielding member 250).

With this, even if the high refractive index insulator 240 and the lens member 220 (provided with respect to opening region 272 in which high refractive index insulator 240 is disposed) are separated, it is easy to cause light emitted from the high refractive index insulator 240 is incident on the lens member 220, and the light emitted from the lens member 220 is incident on the high refractive index insulator 240. That is, the light emitted from the high refractive index insulator 240 is suppressed from being deviated from the lens member 220 and the light emitted from the lens member 220 is suppressed from being deviated from the high refractive index insulator 240.

In the liquid crystal display device 100 according to the above-described embodiment, the following modifications may be further performed. For example, the number of insulating layers (interlayer insulating film) and the number of the light shielding layers forming the light shielding member 250 in the element substrate 200 may be changed as necessary. In addition, for example, a range in which the high refractive index insulator 240 is provided in the thickness direction is not limited to those exemplified in the first embodiment to the fourth embodiment and may be changed as necessary. In addition, for example, a range in the planar view in which the high refractive index insulator 240 is provided in the opening region 272 may be changed as necessary.

Application Example

Figure 17:
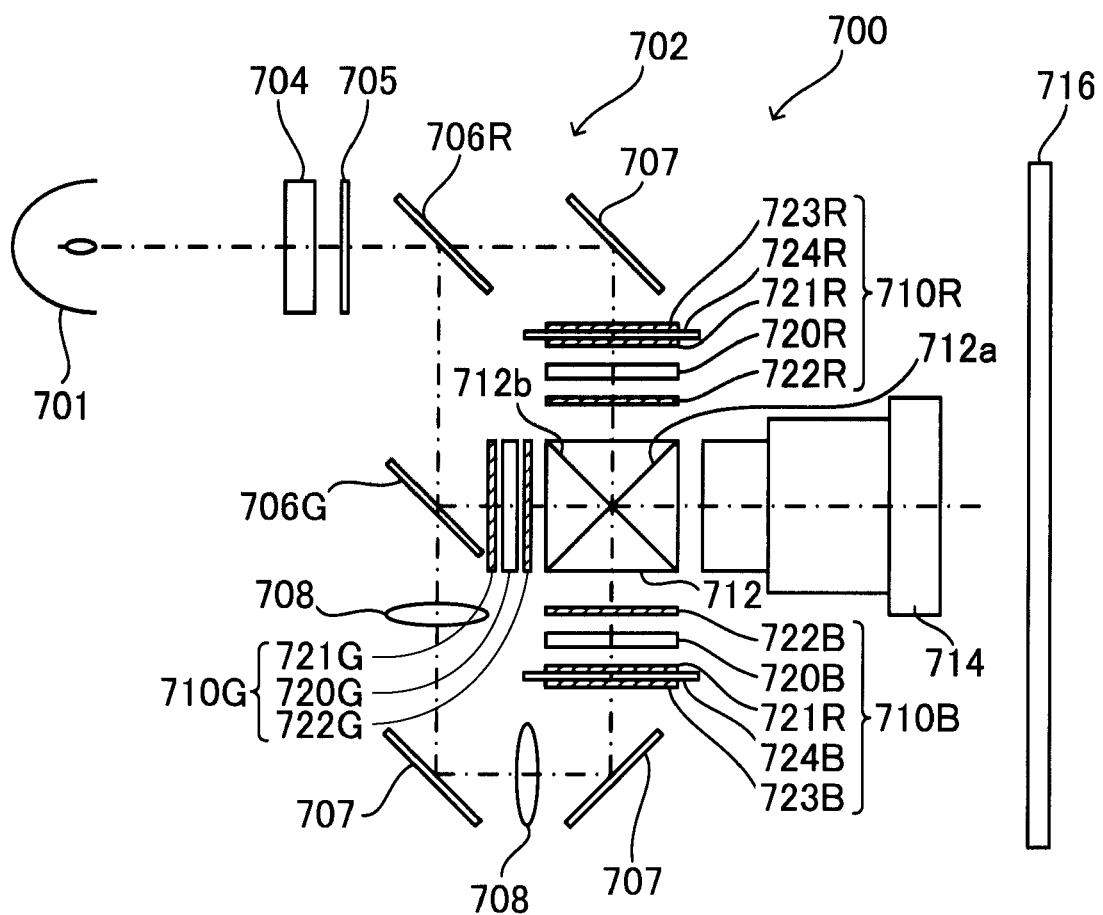
FIG. 17 is a schematic diagram showing an optical system of a projector according to an application example.

Next, as an application example of the above-described embodiment, a projection type display device (projector) will be described. FIG. 17 is a schematic diagram showing an example of an optical system of the projector 700 according to the application example. The projector 700 is configured by including a light source device 701, an integrator 704, a polarization conversion element 705, a color separation light guide optical system 702, a liquid crystal light modulation device 710R as a light modulation device, a liquid crystal light modulation device 710G, a liquid crystal light modulation device 710B, a cross dichroic prism 712, and the projection optical system 714. The liquid crystal display devices 720R, 720G, and 720B described below are provided in the liquid crystal light modulation devices 710R, 710G, and 710B. As the liquid crystal display devices 720R, 720G, and 720B, for example, it is possible to use the above-described liquid crystal display device 100.

The light source device 701 supplies light including red light (hereinafter, referred to as "R light") that is a first color light, green light (hereinafter, referred to as "G light") that is a second color light, and blue light (hereinafter, referred to as "B light") that is a third color light. As the light source device 701, for example, an extra-high pressure mercury lamp can be used.

The integrator 704 equalizes illuminance distribution of light emitted from the light source device 701. Light of which the illuminance distribution is equalized is converted into polarized light having a specific oscillation direction, for example, s-polarized s-polarized light with respect to, a reflecting surface of the color separation light guide optical system 702 by the polarization conversion element 705. The light converted into the s-polarized light is incident on an R light transmitting dichroic mirror 706R configuring the color separation light guide optical system 702.

The color separation light guide optical system 702 is configured by including the R light transmitting dichroic mirror 706R, a B light transmitting dichroic mirror 706G, three reflecting mirrors 707, and two relay lenses 708.

The R light transmitting dichroic mirror 706R transmits the R light, and reflects the G light and the B light. The R light transmitted through the R light transmitting dichroic mirror 706R is incident on the reflecting mirror 707.

The reflecting mirror 707 bends the optical path of the R light by 90 degrees. The R light bent by the optical path is incident on a liquid crystal light modulation device 710R for the R light. The liquid crystal light modulation device 710R for the R light is a transmissive liquid crystal device which modulates the R light according to the image signal.

The liquid crystal light modulation device 710R for the R light includes a $\lambda/2$ phase difference plate 723R, a glass plate 724R, a first polarizing plate 721R, a liquid crystal display device 720R, and a second polarizing plate 722R. The $\lambda/2$ phase difference plate 723R and the first polarizing plate 721R are arranged in a state of being in contact with a light transmitting glass plate 724R which does not change a polarization direction. In FIG. 10, the second polarizing plate 722R is independently provided, but the second polarizing plate 722R may be arranged in a state of being in contact with an exit surface of the liquid crystal display device 720R or an incident surface of the cross dichroic prism 712.

The G light and the B light reflected by the R light transmitting dichroic mirror 706R can be bent by 90 degrees in the optical path. The G light and the B light of which the optical path is bent are incident on the B light transmitting dichroic mirror 706G. The B light transmitting dichroic mirror 706G reflects the G light and transmits the B light. The G light reflected by the B light transmitting dichroic mirror 706G is incident on the liquid crystal light modulation device 710G for the G light. The liquid crystal light modulation device 710G for the G light is the transmissive liquid crystal device which modulates the G light according to the image signal. The liquid crystal light modulation device 710G for the G light includes a liquid crystal display device 720G, a first polarizing plate 721G, and a second polarizing plate 722G.

The G light incident on the liquid crystal light modulation device 710G for the G light is converted into the s-polarized light. The s-polarized light incident on the liquid crystal light modulation device 710G for the G light transmits the first polarizing plate 721G as it is, and is incident on the liquid crystal display device 720G. The s-polarized light incident on the liquid crystal display device 720G is modulated according to the image signal such that the G light is converted into p-polarized light. By the modulation of the liquid crystal display device 720G, the G light converted into the p-polarized light is emitted from the second polarizing plate 722G. In this manner, the G light modulated by the liquid crystal light modulation device 710G for the G light is incident on the cross dichroic prism 712.

The B light transmitted through the B light transmitting dichroic mirror 706G is incident on the liquid crystal light modulation device 710B for the B light through two relay lenses 708 and two reflecting mirrors 707.

The liquid crystal light modulation device 710B for the B light is the transmissive liquid crystal device which modulates the B light according to the image signal. The liquid crystal light modulation device 710B for the B light includes a $\lambda/2$ phase difference plate 723B, a glass plate 724B, a first polarizing plate 721B, a liquid crystal display device 720B, and a second polarizing plate 722B.

The B light incident on the liquid crystal light modulation device 710B for the B light is converted into the s-polarized light. The s-polarized light incident on the liquid crystal light modulation device 710B for the B light is converted into the p-polarized light by the $\lambda/2$ phase difference plate 723B. The B light converted into the p-polarized light transmits the glass plate 724B and the first polarizing plate 721B as it is and is incident on the liquid crystal display device 720B. The p-polarized light incident on the liquid crystal display device 720B is modulated according to the image signal such that the B light is converted into the s-polarized light. By the modulation of the liquid crystal display device 720B, the B light converted into the s-polarized light is emitted from the second polarizing plate 722B. The B light modulated by the liquid crystal light modulation device 710B for the B light is incident on the cross dichroic prism 712.

In this manner, the R light transmitting dichroic mirror 706R and the B light transmitting dichroic mirror 706G configuring the color separation light guide optical system 702 separates light supplied from the light source device 701 into the R light that is the first color light, the G light that is the second color light, and the B light that is the third color light.

The cross dichroic prism 712 that is a color combining optical system is configured by disposing two dichroic films 712a and 712b orthogonally in an X shape. The dichroic film 712a reflects the B light and transmits the G light. The dichroic film 712b reflects the R light and transmits the G light. In this manner, the cross dichroic prism 712 combines the R light, the G light, and the B light modulated by the liquid crystal light modulation device 710R for the R light, the liquid crystal light modulation device 710G for the G light, and the liquid crystal light modulation device 710B for the B light, respectively.

The projection optical system 714 projects light combined by the cross dichroic prism 712 on the screen 716. With this, it is possible to obtain a full color image on the screen 716. As described above, the above-described liquid crystal display device 100 can be used for the projector 700 as an example.

The above-described liquid crystal display device 100 can be used for a front projection type projector which projects an image from a side of observing a projection image or can be used for a rear projection type projector which projects the image from a side opposite to the side for observing the projection image.

An electronic device to which the liquid crystal display device 100 can be applied is not limited to the projector. The liquid crystal display device 100 may be used as a display unit of an information terminal device such as a projection type HUD (head up display), a direct view type HMD (head mounted display), an electronic book, a personal computer, a digital still camera, a liquid crystal television, a view finder type or monitor direct view type video recorder, a car navigation system, an electronic notebook, and a POS.

In the above description, as an example of an electro-optical device (or display device) including the element substrate 200 (substrate for electro-optical device) having the high refractive index insulator 240 and the lens member 220 functioning as the waveguide, the liquid crystal display device 100 is described. However, the embodiment of the invention is not limited to such a configuration. The high refractive index insulator 240 and the lens member 220 functioning as the waveguide may be applied to another electro-optical device (or display device) such as an electrophoretic display device and an organic electroluminescence device in order to, for example, improve the light utilization efficiency.

The entire disclosure of Japanese Patent Application No. 2017-086944, filed Apr. 26, 2017 is expressly incorporated by reference herein.

What is claimed is:

1. An electro-optical device comprising:
a pair of substrates; and
a liquid crystal layer that is interposed between the pair of substrates;
one of the pair of substrates including:
a pixel electrode;
a light shielding member that includes a first light shielding layer, a second light shielding layer that is disposed between the pixel electrode and the first light shielding layer, and a third light shielding layer that is disposed between the pixel electrode and the second light shielding layer;
a first insulator that is overlapped with the light shielding member in a planar view, the first insulator including a first insulating layer covering the first light shielding layer, a second insulating layer covering the second light shielding layer, and a third insulating layer covering the third light shielding layer, the first insulating layer having a first side surface in a region surrounded by the light shielding member, the second insulating layer having a second side surface in the region surrounded by the light shielding member, the third insulating layer having a third side surface in the region surrounded by the light shielding member;
a second insulator that is provided to be in contact with the first side surface of the first insulating layer, the second side surface of the second insulating layer, and the third side surface of the third insulating layer in the region surrounded by the light shielding member, the second insulator having a refractive index higher than that of the first insulating layer, the second insulating layer, and the third insulating layer;
a base member that includes a concave portion; and
a lens member that is provided on the base member, the lens member having a refractive index higher than that of the base member,
wherein an edge of the lens member is disposed outside the second insulator in the planar view.

2. The electro-optical device according to claim 1, wherein the second insulator is disposed by being separated from the light shielding member.

3. The electro-optical device according to claim 1, wherein the second insulator and the lens member are separated from each other in a thickness direction.

4. The electro-optical device according to claim 1, wherein the first insulator is disposed between the lens member and the second insulator in a thickness direction.

5. The electro-optical device according to claim 1, wherein the second insulator is disposed to a position close to the lens member with respect to the light shielding member in a thickness direction.

6. An electronic device comprising the electro-optical device according to claim 1.

7. The electro-optical device according to claim 1, wherein the second insulator is in contact with the lens member.

* * * * *